United States Patent
Hua

(10) Patent No.: US 8,483,613 B2
(45) Date of Patent: Jul. 9, 2013

(54) METHOD OF CONNECTION ESTABLISHMENT AND BLUETOOTH DEVICE

(75) Inventor: Yu-Cheng Hua, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 180 days.

(21) Appl. No.: 12/963,555

(22) Filed: Dec. 8, 2010

(65) Prior Publication Data

US 2011/0171908 A1    Jul. 14, 2011

(30) Foreign Application Priority Data

Jan. 11, 2010   (TW) ............................... 99100609 A

(51) Int. Cl.
*H04B 7/00*   (2006.01)

(52) U.S. Cl.
USPC ........................................ 455/41.2; 455/41.1

(58) Field of Classification Search
USPC ............................... 455/41.1, 41.2
See application file for complete search history.

(56) References Cited

U.S. PATENT DOCUMENTS

| 7,849,150 B2 * | 12/2010 | Loeebbert et al. ............ 709/208 |
| 2002/0190128 A1 | 12/2002 | Levine |
| 2007/0211624 A1 * | 9/2007 | Schmidt et al. ............... 370/225 |
| 2008/0081563 A1 | 4/2008 | Sugikawa |
| 2009/0181653 A1 * | 7/2009 | Alharayeri ................. 455/414.1 |
| 2010/0151791 A1 * | 6/2010 | Yi et al. ....................... 455/41.3 |

FOREIGN PATENT DOCUMENTS

| CN | 101340212 A | 1/2009 |
| TW | 200525946 | 8/2005 |

OTHER PUBLICATIONS

Office action mailed on Dec. 28, 2012 for the China application No. 201010000750.0, p. 3 line 3~31 and p. 4 line 1~25.
Office action mailed on Feb. 23, 2013 for the Taiwan application No. 099100609, filing date: Jan. 11, 2010, p. 1 line 7~14, p. 2~3 and p. 4 line 1~12.

\* cited by examiner

*Primary Examiner* — Tuan H Nguyen
(74) *Attorney, Agent, or Firm* — Winston Hsu; Scott Margo

(57) ABSTRACT

A connection establishing method for a slave Bluetooth device supporting a plurality of Bluetooth profiles, includes generating an indication value according to a selecting signal inputted to the Bluetooth device, the indication value indicating a Bluetooth profile to be used, deciding whether to modify a hardware address of the Bluetooth device according to the indication value and a state value that indicates a Bluetooth profile currently used, and establishing a connection with a master Bluetooth device according to the Bluetooth profile to be used indicated by the indication value.

10 Claims, 2 Drawing Sheets

METHOD OF CONNECTION ESTABLISHMENT AND BLUETOOTH DEVICE

BACKGROUND OF THE INVENTION

1. Field of the Invention

The present invention relates to a connection establishing method and Bluetooth device, and more particularly, to a connection establishing method for establishing a connection with a master Bluetooth device using different hardware address according to a Bluetooth profile currently used, and Bluetooth device thereof.

2. Description of the Prior Art

Bluetooth, a short-distance wireless communication technique using 2.4 GHz frequency band, has advantages of low price, low power consumption and supporting audio and data transmission. Bluetooth technique has widespread applications. For example, cell phone users receive calls with Bluetooth headsets, and computers with Bluetooth keyboard and Bluetooth mouse connect to printers via a Bluetooth transmission interface, which largely decrease inconvenience of connecting to accessories via traditional cable lines. Or, all computers in a conference room perform data synchronization or share the Internet via the Bluetooth transmission interface. Besides the above applications in personal computer and mobile communication fields, the Bluetooth technique can also be applied in retail and warehouse businesses. For example, a Bluetooth barcode scanner is capable of transmitting scanned barcodes to the computers for tens of meters round, which enhances convenience of logistics management.

Services provided by Bluetooth devices are defined by Bluetooth profiles. Headset profile (HSP), cordless telephony profile (CTP), serial port profile (SPP), and human interface device profile (HID), are common profiles. The SPP replaces a traditional RS-232 transmission cable, and the HID realizes the Bluetooth keyboard, Bluetooth mouse, or Bluetooth joystick. Each Bluetooth device has a 6-byte hardware address, or medium access control (MAC) address, such as 00:4C:21:7F:D2:50.

When a master Bluetooth device obtains a hardware address of a slave Bluetooth device, and acquires that the hardware address is not yet paired with it, the master Bluetooth device triggers an automatically pairing process. Afterward, each time when the slave Bluetooth device connects with the master Bluetooth device, the master Bluetooth device is capable of recognizing a service provided by the slave Bluetooth device by the hardware address, so as to shorten time needed for pairing and accelerate connection speed. A normal Bluetooth device is capable of supporting one and upward Bluetooth profile, but can only establish a connection in only one Bluetooth profile at a time.

Take a prior art Bluetooth barcode scanner supporting the SPP and the HID as an example. The Bluetooth barcode scanner is a slave Bluetooth device that has to establish a connection with a computer as a master Bluetooth device. The computer preliminarily chooses to perform pairing in a profile of the Bluetooth barcode scanner, such as the SPP. Assume that a user adopts the SPP on the Bluetooth barcode scanner for a period of time and then changes settings to transmit barcode data in the HID, and in this situation, although the hardware address of the Bluetooth barcode scanner obtained by the computer is identical to the hardware address previously recorded, the computer can neither accurately receive the barcode data transmitted by the Bluetooth barcode scanner in the HID nor trigger a new pairing process with the Bluetooth barcode scanner in the HID since the corresponding Bluetooth service does not use the SPP previously paired in. Under such circumstances, the user has to manually delete the paired Bluetooth barcode scanner in the computer and manually controls the computer to perform re-pairing with the Bluetooth barcode scanner in the HID so as to use the Bluetooth barcode scanner normally.

From the above, in the prior art, each time when the user changes the Bluetooth profile in use, the user has to manually control the computer to perform re-pairing with the Bluetooth device. Accordingly, user convenience of the Bluetooth device is decreased.

SUMMARY OF THE INVENTION

It is therefore a primary objective of the claimed invention to provide a connection establishing method and Bluetooth device.

An embodiment of the invention discloses a connection establishing method for a slave Bluetooth device supporting a plurality of Bluetooth profiles, which includes generating an indication value according to a selecting signal inputted to the Bluetooth device, the indication value indicating a Bluetooth profile to be used, deciding whether to modify a hardware address of the Bluetooth device according to the indication value and a state value that indicates a Bluetooth profile currently used, and establishing a connection with a master Bluetooth device according to the Bluetooth profile to be used indicated by the indication value.

An embodiment of the invention further discloses a Bluetooth device capable of enhancing convenience, which includes an antenna, for transmitting a radio frequency signal to a master Bluetooth device, to establish a connection with the master Bluetooth device, a radio frequency processing unit, coupled to the antenna, for processing a digital signal to generate the radio frequency signal, a memory, for storing a plurality of addresses corresponding to a plurality of Bluetooth profiles, a control unit, for generating an indication value according to a selecting signal inputted to the Bluetooth device, the indication value indicating a Bluetooth profile to be used, and a digital signal processing unit, coupled to the radio frequency processing unit, the memory and the control unit, for deciding whether to modify a hardware address of the Bluetooth device according to the indication value and a state value that indicates a Bluetooth profile currently used, and for establishing the connection with the master Bluetooth device according to the Bluetooth profile to be used indicated by the indication value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
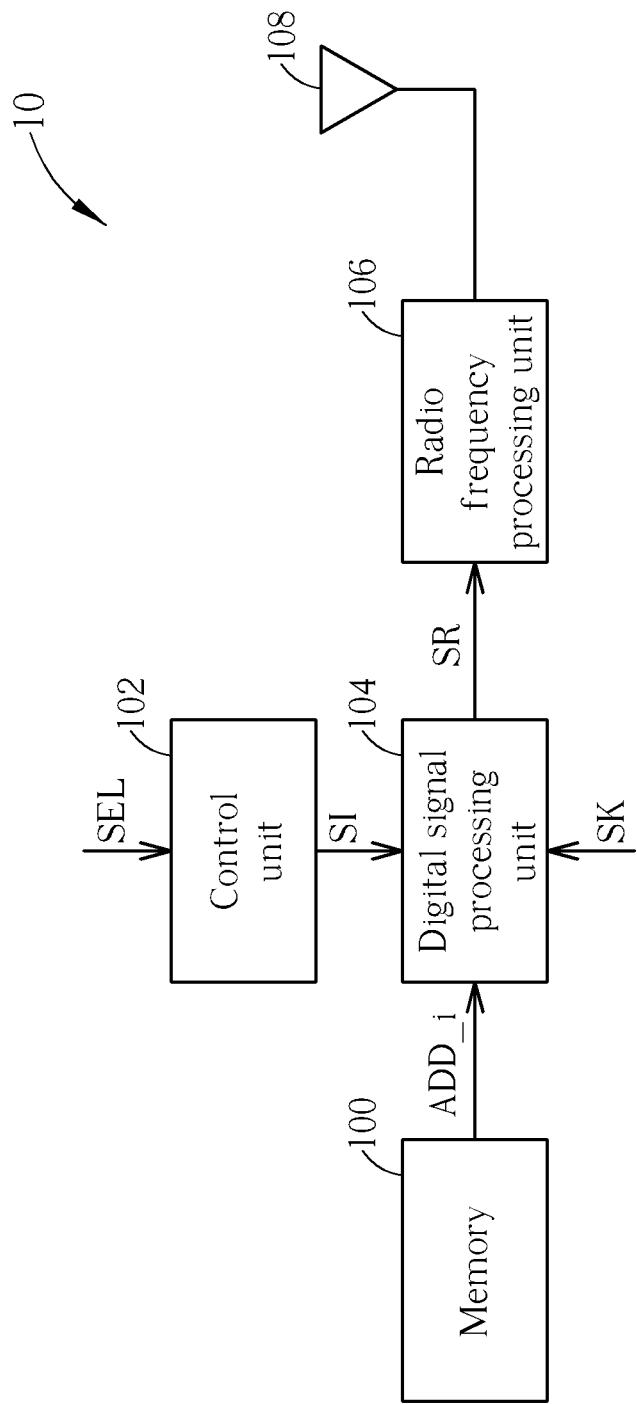
FIG. 1 is a block diagram of a Bluetooth device according to an embodiment of the invention.

Please refer to FIG. 1. FIG. 1 is a block diagram of a Bluetooth device 10 according to an embodiment of the invention. The Bluetooth device 10 is a slave device supporting multiple Bluetooth profiles BP_1-BP_N, and adopts one of the Bluetooth profiles to establish the connection with another Bluetooth device as a master device. Take an application of the logistics management as an example. The master Bluetooth device can be a computer, and the slave Bluetooth device 10 can be a Bluetooth barcode scanner supporting the SPP and the HID.

The Bluetooth device 10 includes a memory 100, a control unit 102, a digital signal processing unit 104, a radio frequency processing unit 106 and an antenna 108. The digital signal processing unit 104 is coupled to the memory 100, the control unit 102, and the radio frequency processing unit 106, and the antenna 108 is coupled to the radio frequency processing unit 106. The memory 100 is a non-volatile random access memory installed in the Bluetooth device 10, for storing N addresses ADD_1-ADD_N, which are recorded in the memory 100 in a manufacturing process of the Bluetooth device 10. Value of each address is different. Take the general setting of the hardware address as an example; each address is of 6-byte length, corresponding to a Bluetooth profile among the Bluetooth profiles BP_1-BP_N, and is selectively the hardware address of the Bluetooth device 10.

Please note that in the manufacturing process of the prior art Bluetooth device, only one address is recorded as the hardware address of the Bluetooth device in each Bluetooth device. Therefore, no matter the Bluetooth device establishes the connection in which Bluetooth profile, the hardware address of the Bluetooth device is never changed. On the contrary, in the manufacturing process of the Bluetooth device 10, N addresses are recorded in each Bluetooth device 10. The hardware address of the Bluetooth device 10 varies with the Bluetooth profile currently in use. Each Bluetooth device 10 utilizes K bits to identify Bluetooth profiles BP_1-BP_N, and K is the minimum value whereby $2^K \geq N$ is established. For example, if the Bluetooth device 10 supports 2 Bluetooth profiles, only 1 bit (K=1) is needed in an address corresponding to each Bluetooth profile to identify the 2 Bluetooth profiles; if the Bluetooth device 10 supporting 3 Bluetooth profiles, 2 bits are needed to identify the 3 Bluetooth profiles.

Take a Bluetooth barcode scanner supporting the SPP and the HID as an example, a least significant bit of an address can be used to identify the SPP and the HID. Assume that in a Bluetooth barcode scanner A, the address corresponding to the SPP is 00:4C:21:7F:D2:50 and the least significant bit is "0", while the address corresponding to the HID can be 00:4C:21:7F:D2:51 and the least significant bit is "1". Similarly, in another Bluetooth barcode scanner B, the address corresponding to the SPP is 00:4C:21:7F:D2:52 and the least significant bit is "0", while the address corresponding to the HID can be 00:4C:21:7F:D2:53 and the least significant bit is "1". Please note that using the least significant bit of the address to identify 2 Bluetooth profiles is merely an embodiment of the invention that facilitates the production process. The invention is not limited to utilization of the least significant bit, and a bit in other position can also be utilized to identify 2 Bluetooth profiles. Similarly, when more than 1 bit is used to identify Bluetooth profiles, positions of these bits are also without limitations.

The Bluetooth device 10 has a default Bluetooth profile set in a startup procedure of the Bluetooth device 10. Since the startup procedure of the Bluetooth device 10 is the same as the prior art Bluetooth device and is well-known for those skilled in the art, it is abridged herein. The following operations of the control unit 102 and the digital signal processing unit 104 are performed according to how the user controls the Bluetooth device 10 after the startup procedure is finished. The control unit 102 is a user interface for generating an indication value SI according to a selecting signal SEL inputted to the Bluetooth device 10 when the user presses a selecting key, and outputting the indication value SI to the digital signal processing unit 104. The indication value SI indicates a Bluetooth profile to be used, BP_i, which is one of the Bluetooth profiles BP_1-BP_N.

The digital signal processing unit 104 is utilized for deciding whether to modify the hardware address of the Bluetooth device 10 according to the indication value SI and a state value SK that indicates a Bluetooth profile currently used, BP_k. If the indication value SI is identical to the state value SK, which means the Bluetooth profile to be used BP_i is the same as the Bluetooth profile currently used BP_k in the Bluetooth device 10, the digital signal processing unit 104 maintains the hardware address of the Bluetooth device 10 That is, the hardware address remains an address ADD_k corresponding to the Bluetooth profile BP_k. The Bluetooth device 10 establishes the connection with the master Bluetooth device according to the Bluetooth profile BP_i (which is also the Bluetooth profile BP_k). Please note that the key point of the invention is establishing the connection according to the Bluetooth profile selected by the user. In the situation that the Bluetooth profile and the hardware address remain the same, the connection between the Bluetooth device 10 and the master Bluetooth device can be maintained or re-established.

On the contrary, if the digital signal processing unit 104 acquires that the indication value SI is different from the state value SK, which indicates the user intends to change Bluetooth profile used in the Bluetooth device 10 from the Bluetooth profile BP_k to the Bluetooth profile BP_i, the digital signal processing unit 104 reads an address ADD_i corresponding to the Bluetooth profile BP_i from the memory 100, and sets the hardware address of the Bluetooth device 10 to the address ADD_i. After the hardware address of the Bluetooth device 10 is changed, the Bluetooth device 10 establishes the connection with the master Bluetooth device according to the Bluetooth profile BP_i. The establishing method of the connection is identical to the prior art, and is abridged as follows. The digital signal processing unit 104 generates a connection request signal SR including the hardware address ADD_i, the Bluetooth profile BP_i, and other information needed for establishing a connection. The radio frequency processing unit 106 transforms the connection request signal SR generated by the digital signal processing unit 104 to a radio frequency signal, and the antenna 108 radiates the radio frequency signal to air. Afterward, the master Bluetooth device performs pairing with the Bluetooth device 10 to establish the connection.

Note that the advantage of the Bluetooth device 10 lies in the difference of the hardware address of the Bluetooth device 10 between each Bluetooth profile in use. Assume the user has not established the connection with the master Bluetooth device in the Bluetooth profile BP_i. When the master Bluetooth device receives the connection request signal SR, the master Bluetooth device identifies the hardware address ADD_i as an unpaired hardware address of a Bluetooth device, such that the master Bluetooth device is capable of triggering the automatically pairing process to establish the connection with the Bluetooth device 10. Preferably, since the master Bluetooth device identifies the hardware address ADD_i belonging to an unpaired slave Bluetooth device rather than the Bluetooth device 10 connected in the Bluetooth profile BP_k, the master Bluetooth device does not delete pairing of the hardware address ADD_k. As a result, when the user selects the Bluetooth profile BP_k afterward, the Bluetooth device 10 is capable of establishing the connection with the master Bluetooth device in the Bluetooth profile BP_k without re-pairing.

Take the Bluetooth barcode scanner as the example. In the prior art Bluetooth barcode scanner, assume the user changes from the SPP originally in use to the HID. Since the hardware address of the Bluetooth barcode scanner read by the computer is different from the Bluetooth profile originally recorded, the computer can neither accurately receive the barcode data transmitted by the Bluetooth barcode scanner in the HID, nor trigger a new pairing process with the Bluetooth barcode scanner in the HID automatically. The user has to manually delete the paired Bluetooth barcode scanner in the computer in order to re-pairing the Bluetooth barcode scanner in the HID. In comparison, in the Bluetooth barcode scanner employing the invention, the SPP and the HID are corresponding to different hardware addresses. Assume the user changes from the SPP originally in use to the HID; the computer identifies the same Bluetooth barcode scanner as different slave Bluetooth devices by different hardware addresses. Therefore, the computer is capable of triggering the automatic pairing process without deleting the pairing of the hardware address originally corresponding to the SPP. When the user changes to the SPP afterward, since the Bluetooth barcode scanner in the SPP is previously paired, the Bluetooth barcode scanner is capable of establishing the connection with the master Bluetooth device without re-pairing.

From the above, in such situation that the user may frequently change the Bluetooth profile in use, the invention largely shortens the time needed for pairing the slave Bluetooth device with the master Bluetooth device, and the user does not have to operate the master Bluetooth device manually for re-pairing. Accordingly, the convenience brought by portability of the Bluetooth device is largely increased.

Figure 2:
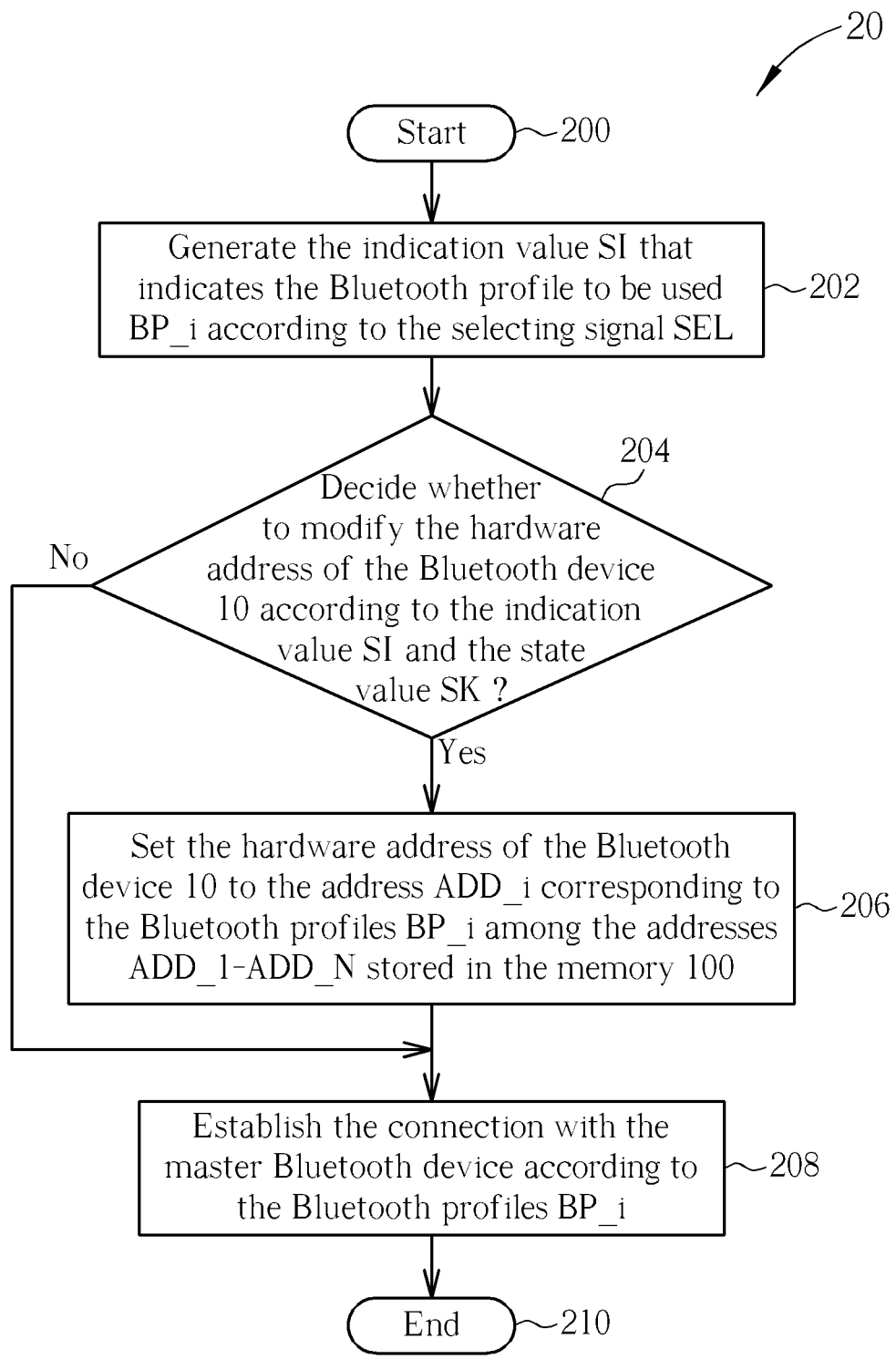
FIG. 2 is a flowchart of a process according to an embodiment of the invention.

Please refer to FIG. 2. FIG. 2 is a flowchart of a process 20 according to an embodiment of the invention. The process 20 is utilized in the Bluetooth device 10 in FIG. 1, for re-establishing a connection with the master Bluetooth device when the Bluetooth profile in use is changed. The process 20 includes the following steps:

Step 200: Start.

Step 202: Generate the indication value SI that indicates the Bluetooth profile to be used BP_i according to the selecting signal SEL.

Step 204: Decide whether to modify the hardware address of the Bluetooth device 10 according to the indication value SI and the state value SK. If the indication value SI is different from the state value SK, perform step 206; if the indication value SI is identical to the state value SK, perform step 208.

Step 206: Set the hardware address of the Bluetooth device 10 to the address ADD_i corresponding to the Bluetooth profiles BP_i among the addresses ADD_1-ADD_N stored in the memory 100.

Step 208: Establish the connection with the master Bluetooth device according to the Bluetooth profiles BP_i.

Step 210: End.

The steps 202, 204, and 206 are operation steps of the control unit 102 and the digital signal processing unit 104, respectively. The step 208 is an operation step of digital signal processing unit 104, the radio frequency processing unit 106, and the antenna 108. Meanings of each unit, signal, and value are detailed in the above description of the Bluetooth device 10, and are not narrated herein. Via the process 20, when the Bluetooth profile used in the Bluetooth device 10 changes, the hardware address of the Bluetooth device 10 changes accordingly. As a result, the master Bluetooth device automatically performs the pairing and establishes the connection with the Bluetooth device 10 after the hardware address changed. The user does not have to delete the paired Bluetooth device 10 in the master Bluetooth device manually.

To sum up, the invention changes the hardware address of the Bluetooth device when the slave Bluetooth device uses different Bluetooth profiles, accordingly. Therefore, the master Bluetooth device is capable of automatically performing the pairing and establishing the connection with the slave Bluetooth device. In such situation that the user may frequently change the Bluetooth profile in use, the invention largely shortens the time for pairing, so as to enhance the user convenience of the Bluetooth device.

Those skilled in the art will readily observe that numerous modifications and alterations of the device and method may be made while retaining the teachings of the invention.

What is claimed is:

1. A connection establishing method for a slave Bluetooth device supporting a plurality of Bluetooth profiles, comprising:
    storing a plurality of hardware addresses of the slave Bluetooth device, which respectively correspond to the plurality of Bluetooth profiles;
    generating an indication value according to a selecting signal inputted to the slave Bluetooth device, the indication value indicating a Bluetooth profile to be used;
    deciding whether to modify a hardware address currently used of the slave Bluetooth device with a hardware address to be used according to the indication value and a state value that indicates a Bluetooth profile currently used, comprising:
        setting the hardware address currently used to the hardware address to be used corresponding to the Bluetooth profile to be used among the plurality of hardware addresses stored in a memory of the slave Bluetooth device when the indication value is different from the state value; and
    establishing a connection with a master Bluetooth device according to the Bluetooth profile to be used and the hardware address to be used;
    wherein services provided by the slave Bluetooth device are based on the plurality of Bluetooth profiles.

2. The connection establishing method of claim 1, wherein the step of deciding whether to modify a hardware address currently used of the slave Bluetooth device with a hardware address to be used according to the indication value and a state value comprises:
    maintaining the hardware address currently used when the indication value is identical to the state value.

3. The connection establishing method of claim 1, wherein the quantity of the plurality of Bluetooth profiles is 2.

4. The connection establishing method of claim 3, wherein the hardware address to be used and the hardware address currently used are different in a least significant bit.

5. The connection establishing method of claim 1, wherein the slave Bluetooth device is a Bluetooth barcode scanner.

6. A Bluetooth device capable of enhancing convenience, comprising:
    an antenna, for transmitting a radio frequency signal to a master Bluetooth device, to establish a connection with the master Bluetooth device;
    a radio frequency processing unit, coupled to the antenna, for processing a digital signal to generate the radio frequency signal;
    a memory, for storing a plurality of hardware addresses corresponding to a plurality of Bluetooth profiles;

a control unit, for generating an indication value according to a selecting signal inputted to the Bluetooth device, the indication value indicating a Bluetooth profile to be used; and a digital signal processing unit, coupled to the radio frequency processing unit, the memory and the control unit, for deciding whether to modify a hardware address currently used of the Bluetooth device with a hardware address to be used according to the indication value and a state value that indicates a Bluetooth profile currently used, and for establishing the connection with the master Bluetooth device according to the Bluetooth profile to be used and the hardware address to be used indicated by the indication value;

wherein services provided by the slave Bluetooth device are based on the plurality of Bluetooth profiles;

wherein the digital signal processing unit sets the hardware address currently used to the hardware address to be used corresponding to the Bluetooth profile to be used among the plurality of hardware addresses stored in the memory when the indication value is different from the state value.

7. The Bluetooth device of claim 6, wherein the digital signal processing unit maintains the hardware address currently used when the indication value is identical to the state value.

8. The Bluetooth device of claim 6, wherein the quantity of the plurality of Bluetooth profiles is 2.

9. The Bluetooth device of claim 8, wherein the hardware address to be used and the hardware address currently used are different in a least significant bit.

10. The Bluetooth device of claim 6, wherein the Bluetooth device is a Bluetooth barcode scanner.

* * * * *